United States Patent [19]

Detweiler

[11] 4,416,307
[45] * Nov. 22, 1983

[54] VALVE ASSEMBLY

[75] Inventor: Charles A. Detweiler, Durand, Mich.

[73] Assignee: Schmelzer Corporation, Flint, Mich.

[ * ] Notice: The portion of the term of this patent subsequent to May 4, 1999 has been disclaimed.

[21] Appl. No.: 320,469

[22] Filed: Nov. 12, 1981

Related U.S. Application Data

[62] Division of Ser. No. 107,278, Dec. 26, 1979, Pat. No. 4,327,773.

[51] Int. Cl.³ ............................................. F15B 13/042
[52] U.S. Cl. .......................... 137/625.66; 137/DIG. 8
[58] Field of Search ...................... 137/625.66, DIG. 8

[56] References Cited

U.S. PATENT DOCUMENTS

| 3,081,793 | 3/1963 | Flatt et al. ...................... 137/625.66 |
| 3,389,720 | 6/1968 | Brandenberg .................. 137/625.66 |
| 3,542,289 | 11/1970 | Ojala et al. ................. 137/625.66 X |
| 3,794,075 | 2/1974 | Stoll et al. ....................... 137/625.66 |
| 4,213,481 | 7/1980 | Benjamin ................... 137/DIG. 8 X |
| 4,223,701 | 9/1980 | Bible et al. ............... 137/DIG. 8 X |
| 4,327,773 | 5/1982 | Detweiler ....................... 137/625.66 |

Primary Examiner—Gerald A. Michalsky
Attorney, Agent, or Firm—Fisher, Gerhardt, Crampton & Groh

[57] ABSTRACT

A valve assembly for controlling the delivery of fluid pressure to and from a device to be operated in response to a control pressure. The device to be operated can be activated in one embodiment and deactivated in another enbodiment of the invention by the supply of control pressure with both embodiments of the valve assembly employing a major number of common parts.

3 Claims, 3 Drawing Figures

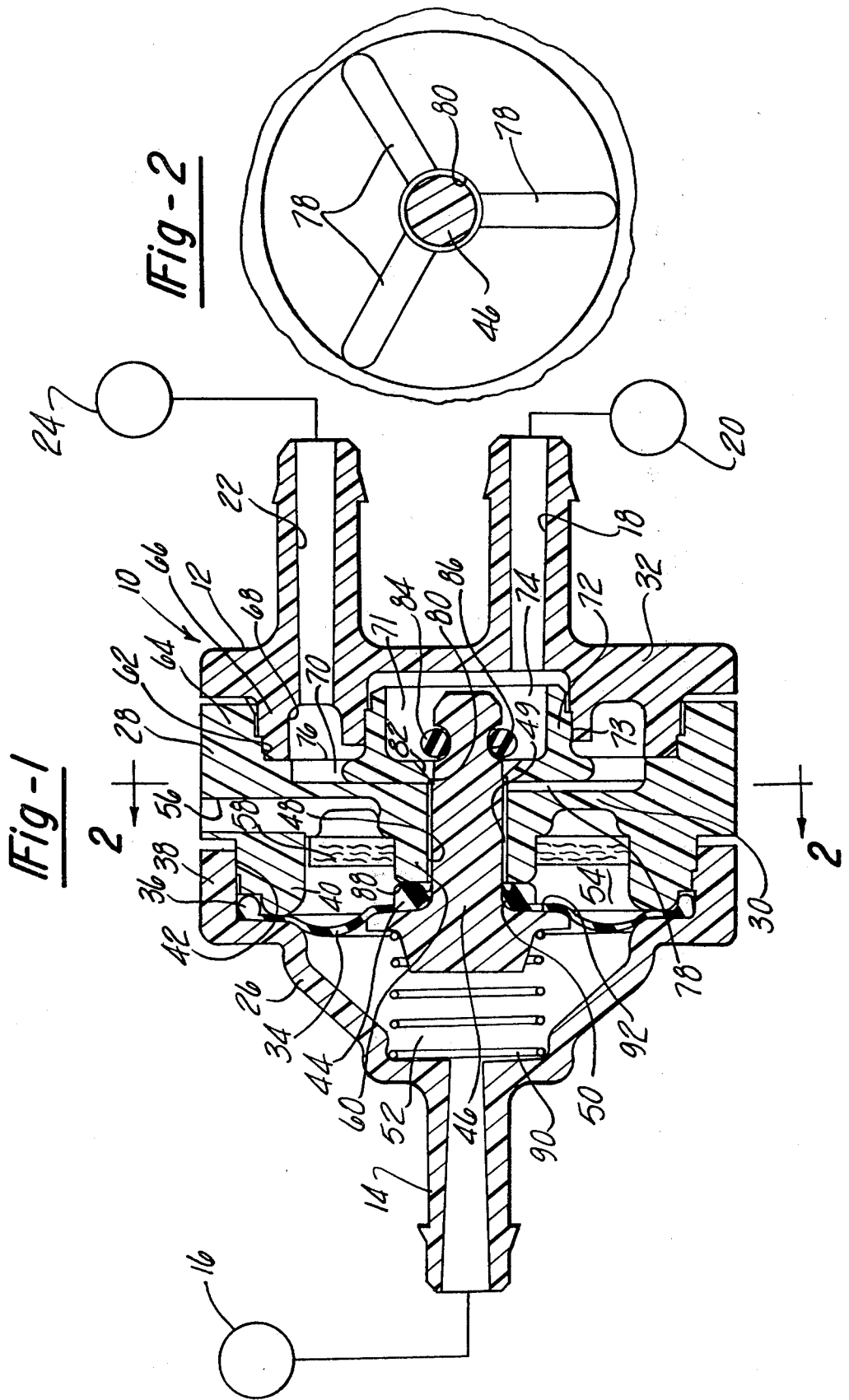

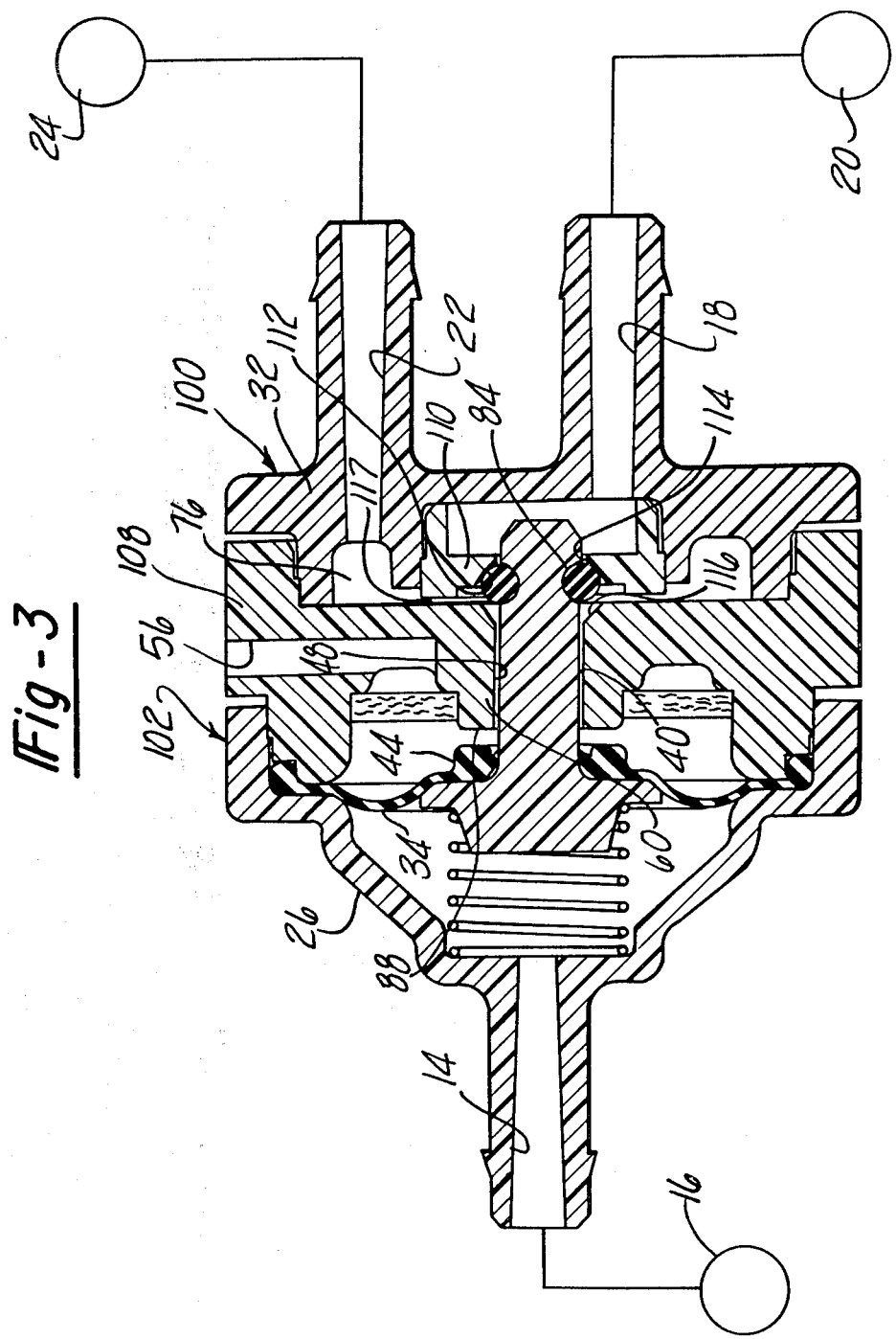

VALVE ASSEMBLY

This application is a division of application Ser. No. 107,278, filed Dec. 26, 1979, now U.S. Pat. No. 4,327,773.

This invention relates to fluid actuated control valves and more particularly to diaphragm type vacuum valves.

Todays automotive vehicles employ a multitude of switches and valves to control the operation of a large number of functions of devices such as transmission, heaters and air conditioners, vent systems and carburetor controls. These valves and switches are responsive to various conditions such as temperature or pressures. In many instances it is possible to substitute fluid actuated vacuum valves for more expensive electrically operated or temperature responsive switches. A large number of such vacuum valves can be controlled by a single thermo responsive switch. The servo valves perform much the same function as relays and are responsive to a differential pressure to activate a vacuum operated device by placing it in communication with a source of vacuum or must be capable of the reverse operation, that is, to deactivate the vacuum operated device upon receiving a vacuum signal and also to vent the device to atmosphere in readiness for actuation.

The activating and deactivating functions require different valves and it is highly desirable that the valves incorporate many common parts to make it possible to more economically manufacture and assemble large numbers of such valves.

It is an object of the invention to provide a valve assembly in which both the activating and deactivating functions can be performed by valves having a majority of identical parts.

Still another object of the invention is to provide valve assemblies which are simple to assemble and do not require careful or complicated orientation of parts relative to each other.

The objects of the invention are accomplished by two embodiments of a valve assembly each of which has a general cylindrical housing divided by a movable wall and a stationary wall to separate the housing into a control chamber at one side of the movable wall and an operating chamber at one side of the stationary wall. A constant pressure chamber is formed between the walls. Valve closure means are moved by a movable wall formed by a diaphragm in the presence of a control pressure in the control chamber so that in one embodiment of the invention operating pressure is supplied to a device to be actuated and in another embodiment of the invention so that the supply of pressure to the device to be actuated is terminated and the device is vented to the atmosphere in readiness to be operated again. Both embodiments of the invention employ a simple diaphragm mounting arrangement and a majority of the components are common, requiring the substitution of only two different parts to achieve both types of operation. Assembly of the components also is facilitated by mounting the diaphragm in a manner so that clamping is not required and by making it unnecessary to orient various parts of the housing in selected position before fixing them together.

The preferred embodiments are illustrated in the drawings in which:

FIG. 1 is a cross sectional view of the valve assembly embodying the invention;

FIG. 2 is a fragmentary plan view of one of the components in FIG. 1 taken generally on line 2—2; and FIG. 3 is a cross sectional view similar to FIG. 1 of another embodiment of the invention.

A valve assembly embodying the invention is designated generally at 10. The valve assembly 10 includes a cylindrical housing 12. The housing 12 has a control port 14 communicating with a source of variable control pressure designated diagramatically at 16. Such a variable pressure source 16 can be a manually or automatically actuated vacuum valve to selectively supply vacuum to the control port 14. The housing 12 also forms a pressure supply port 18 continuously communicating with a source of vacuum such as the manifold 20 of an internal combustion engine. The housing 12 also has a radially offset actuating port 22 which is adapted to be connected to a vacuum operated device designated diagramatically at 24. An example of device 24 would be a vacuum operated motor to open or close an air vent on a vehicle.

The cylindrical housing 12 is made up of an end cap member 26 which is formed integrally with the control port 14, a central housing member 28 which forms a stationary wall 30 in said housing 12. The housing also includes an end cover member 32 which is coaxial with the end cap 26 and central housing member 28 and is formed integrally with the supply port 18 and the actuating port 22. The members 26, 28 and 32 preferrably are molded of plastic material.

In addition to the stationary wall 30, the interior of the housing 12 has a movable wall in the form of a diaphragm 34. The diaphragm 34 has a movable wall in the form of a diaphragm 34. The diaphragm 34 has an outer circumferential bead 36 which is clamped in fluid tight relationship with the end cap 26 and central housing member 28 by means of sonic welding of adjoining surfaces of the complementary flanges 38 and 40 of the end cap 26 and central housing member 28, respectively. The sonic welding tends to fuse the plastic parts together in a sealed relationship at an annular area indicated at 42.

The diaphragm 34 is generally disc shaped and has an annular portion 44 surrounding an elongated operating member 46 which fits loosely in a relatively large bore 48 of the central housing member 28. The loose fit facilitates easy sliding movement and at the same time forms an axially extending fluid passageway 49. The internal diameter of the annular portion 44 of the diaphragm 34 is provided with a lip 50 which engages the operating member 46 to provide a fluid tight seal preventing fluid passage between opposite sides of the diaphragm 34.

The moveable wall formed by the diaphragm 34 forms a control chamber 52 at one side of the diaphragm which communicates with the control port 14. The opposite side of the diaphragm 34 acts with the stationary wall 30 to form a constant pressure chamber 54 which is in continuous communication with the atmosphere through a radially extending port 56 formed in the central housing member 28. An annular filter element 58 is supported on an axially extending collar 60 formed by the stationary wall 30. Filter 58 serves to prevent the entry of dirt particles into the constant pressure chamber 54 which might otherwise impair functioning of the valve assembly 10.

The central housing member 28 and the cover member 32 are sonicly welded together over an annular area at 62 between complementary axially extending annular flanges 64 and 66 forming portions of the central housing member 28 and end wall member 32, respectively. The end wall 32 forms an annular groove 68 radially inwardly of the annular flange 66 which is complementary to a recess 70 formed in the central housing member 28. The end wall or cover member 32 also has a recess 71 radially inwardly of the groove 68 which receives a cup-shaped wall element 72. The cup element 72 is sonicly welded to the wall of the recess 71 at 73 to form a supply chamber 74 which communicates with the supply port 18. The cup element 72 abuts the bottom of the recess 70 so that an annular chamber 76 is formed which is in continuous communication with the actuating port 22. The annular chamber 76 communicates with the fluid passage 49 formed between the operating member 46 and the bore 48 by way of radially extending passages or grooves 78 as seen in FIG. 2 formed in the bottom of the recess 70 of the central housing member 28.

The cup-shaped element 72 has an axially located opening 80 which receives one end of the operating member 46. The opening 80 is larger than the operating member 46 to form a valve passage permitting free fluid passage therethrough. The opening 80 is surrounded by an annular beveled valve seat 82. The valve seat 82 cooperates with an O-ring 84 which is seated in a groove 86 at one end of the operating member 46. The O-ring is adapted to form a valve closure element for movement into and out of engagement with the valve seat 82.

The annular portion 44 of the diaphragm 34 forms another valve closure portion which cooperates with an end surface 88 on the collar 60. In the position shown in FIG. 1 the valve closure means formed by the portion 44 and the O-ring 84 are disposed so that the valve passage 49 is closed to the atmospheric port 56 while at the same time the valve 82, 84 formed by the seat and O-ring is in its open position. Upon movement of the operating member 46 to the left the O-ring closes on the seat 82 and the annular portion 44 moves out of engagement with the end surface 88 to open the passage 49 to the atmospheric passage 56.

In the position shown in FIG. 1 the various parts are shown in their normal position in which the valve closure means including the annular portion 44, the operating member 46 and the O-ring 84 are urged to the right by a return spring 90 and are arranged so that atmospheric pressure is contained in the constant pressure chamber 54 by the closed valve 44, 88. At the same time the supply port 18 is opened through the opened valve 82, 84 to communicate through the radial passages 78 with the annular chamber 76 and consequently with the actuating port 22. This is the condition of the parts at all times when a control pressure is not being supplied to the control port 14 and as a consequence vacuum will be continuously supplied from the supply port 18 to the actuating port 22.

Upon the supply of a control pressure in the form of vacuum to the control chamber 52, a differential pressure is created across the diaphragm 34 causing the operating member 46 to move to the left as viewed in FIG. 1 so that the atmospheric valve 44, 88 opens and the valve 82, 84 closes. Under these conditions, the supply port 18 is closed so that no additional vacuum pressure is delivered to the actuating port 22. At the same time the actuating port 22 is open by way of the annular chamber 76, the radial passages 78, the axial passage 49 to the atmospheric or constant pressure chamber and consequently to the atmosphere by way of the port 56. This serves to establish atmospheric pressure at the actuating port 22 so any devices connected thereto are also returned to an atmospheric condition in readiness for reactuation.

Assembly of the valve assembly 10 is facilitated by the arrangement of the central housing member 28 which has the actuating port 22 radially offset from the axis of the cylindrical housing 12. By arranging the central housing member 28 so that the actuating port 22 communicates with the annular chamber 76, and the latter communicates with the radial passage 78 it is possible to arrange the central housing member 28 and the stationary wall member in any relatively rotated position to each other about the axis of the two parts. No matter in what relatively rotated position the members 28 and 33 are fixed, the actuating port 22 will be in communication with the annular chamber 76 and therefore with at least one of the radial passages 78 so it is unnecessary to exactly orient the parts in some predetermined location prior to sonic welding.

The mounting of the diaphragm 34 to the operating member 46 is such that it facilitates assembly since no special clamping of the diaphragm is required. During assembly, the actuating member is simply pushed through the opening formed by the flexible lip 50. In the complete assembly and in the normal position illustrated in FIG. 1, the spring 90 urges the operating member 46 and the diaphragm 34 to the right so that the portion 44 is seated on the surface 88. This also serves to press the surface 92 of the actuating member 46 into tight sealing engagement with the surface of the diaphragm 34 exposed in the chamber 52. Under such conditions the pressures in the chambers 52 and 54 are equal and pressure leakage therebetween is not critical. Upon actuation of the valve assembly 10, vacuum pressure is made available in the chamber 52 and a differential pressure is created across the diaphragm 34 by atmospheric pressure in the chamber 54. The diaphragm 34 flexes and moves the actuating member 46 to the left. The differential pressure presses the diaphragm 34 against the surface 92 and also tends to force the lip 50 into tight engagement with the outer surface of the actuating member 46 to insure good pressure sealing.

Another embodiment of the invention is shown in FIG. 3. In the prior embodiment shown in FIG. 1 the valve assembly 10 is such that in its normal position the supply port 18 and actuating port 22 are in communication with each other so that actuation of the valve cuts off the supply port 18 and opens the actuating port 22 to the atmospheric port 56. In the embodiment of the invention shown in FIG. 3 the supply port 18 is normally closed with the actuating port 22 open to the atmospheric port 56 so that actuation of the valve places the supply port 18 and actuating port 22 in communication with each other and isolates them from the atmospheric port 56.

In the embodiment shown in FIG. 3 many of the components are identical with those used in the embodiment in FIG. 1 and identical parts bear the identical reference characters.

The valve assembly 100 has a generally cylindrical housing 102 with a control port 14, a supply port 18 and an actuating port 22. The housing 102 includes an end cap 26, a central housing member 108 and an end wall member 32.

In the FIG. 3 embodiment, the annular portion 44 forming part of the diaphragm 34 is normally out of engagement with the end surface 88 and remains out of engagement for all positions of operation so that the atmospheric passage 56 is continuously open to the axial passage 48. This is achieved in the valve assembly 100 by making the annular flange 60 shorter than in the valve assembly 10. Another difference is that a cup shaped member 110 is used instead of the cup element 72. The cup element 110 is provided with an annular valve seat formed by an annular bevel surface 112 around an opening 114. In addition, another beveled valve seat 116 is formed around the end of the bore 48 in the central housing member 108.

In the position shown in FIG. 3, the O-ring 84 forming a part of the closure means is seated on the seat 112 at one end of the operating chamber formed between the valve seats 112 and 116 to close off the supply port 18. At the same time the annular chamber 76 communicates with the bore 48 and the axial passage 49 by way of a passage 117 between the cup element 110 axially spaced from the central housing element 108. From the passage 117 the fluid communicates through passage 49 to the atmospheric port 56 to vent the device 24.

When control pressure is supplied to the control port 14, the diaphragm 34 moves the actuating member 46 to the left so that the O-ring 84 moves from the valve seat 112 and engages the valve seat 116. This opens valve seat 112 and closes valve seat 116 to permit communication between the supply port 18 and the actuating port 22 and at the same time closes off communication with the atmospheric port 56.

In the embodiment shown in FIG. 1 the supply port 18 is normally opened to the actuating port 22 and the atmospheric port 56 is closed whereas in the embodiment in FIG. 3 the supply port 18 and actuating port 22 are normally closed to each other with the actuating chamber 22 open to the atmosphere. Upon supply of control pressure to the ports 14 operation of the device 24 is terminated with the valve assembly 10 of the FIG. 1 embodiment but is initiated with the valve assembly 100 of the FIG. 3 embodiment. This form of operation is accomplished with two valve assemblies incorporating substantially identical components, it being necessary to use a central housing 28 and cup element 72 in one valve and a central housing 108 and cup element 110 for the other valve with all other components being common.

Two embodiments of a valve assembly have been provided in which the supply of control pressure in one embodiment serves to deliver operating pressure to a device to be operated and in another embodiment, terminates the supply of operating pressure and vents the device to atmosphere in readiness for repeated operation. The valve closure means includes valve arrangements in which a closure element in one embodiment coacts with a single valve seat and in another embodiment of the invention with a pair of valve seats. Assembly of the two embodiments is facilitated by the diaphragm mounting arrangement which does not require clamping and by the valve housing in which components can be placed in randum rotated positions relative to each other prior to fastening them together in fluid tight relationship.

The embodiments of the invention in which an exclusive property or privilege is claimed are defined as follows:

1. A valve assembly comprising: a generally cylindrical housing, a movable wall formed by a diaphragm and a stationary wall disposed in said housing and dividing said housing into a control chamber at one side of said diaphragm, a constant pressure chamber between said diaphragm and stationary wall and an operating chamber at one side of said stationary wall, a first valve passage communicating with said constant pressure chamber and said operating chamber, a pressure supply port, a second valve passage communicating said operating chamber with said supply port, an actuating port communicating with said operating chamber, valve closure means being movable between a position wherein said first valve passage is closed and said second valve passage is open and a position in which said first valve passage is open and said second valve passage is closed, said valve closure means being connected to said movable wall for movement therewith by way of an axially movable operating member extending through said diaphragm and held in sealing engagement with said one side of said diaphragm in response to pressure in said control chamber less than said pressure in said constant pressure chamber for movement of said operating member with said diaphragm between said positions upon establishing a control pressure in said control chamber to place said supply port in communication with said operating chamber when said valve closure means is in one of said positions and to close said supply port and open said operating chamber and actuating port to the atmosphere when said valve closure means is in another of said positions, an end wall disposed coaxially with said stationary wall, said supply and actuating ports axially extending from said end wall, one of said ports being disposed radially outwardly from the axis of said housing, said walls being disposed in sealing engagement with each other to form an annular chamber, and radially inwardly extending passage means communicating said annular chamber with said operating chamber, said stationary wall and end wall being disposed in random relationship to each other about the axis of said housing, said one of said ports communicating with said annular chamber for all positions of said stationary wall relative to said end wall.

2. The valve assembly of claim 1 wherein said end wall forms an annular groove coacting with said stationary wall to form said annular chamber.

3. The valve assembly of claim 1 wherein said end wall forms a cavity radially inwardly from said annular chamber, a wall element closing said cavity to form a supply chamber, said wall element forming one of said valve passages.

* * * * *